United States Patent
Sroka et al.

(10) Patent No.: US 8,116,526 B2
(45) Date of Patent: Feb. 14, 2012

(54) METHODS AND SYSTEM FOR COMMUNICATION AND DISPLAYING POINTS-OF-INTEREST

(75) Inventors: Igal Sroka, Michmanim (IL); Ofer Solomon, Maalot (IL); Guy Bar Yosef, Adi (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 708 days.

(21) Appl. No.: 12/276,446

(22) Filed: Nov. 24, 2008

(65) Prior Publication Data
US 2009/0097710 A1    Apr. 16, 2009

Related U.S. Application Data

(62) Division of application No. PCT/IL2007/000608, filed on May 20, 2007.

(51) Int. Cl.
G06K 9/00 (2006.01)
G06K 9/36 (2006.01)

(52) U.S. Cl. ........................ 382/103; 382/276
(58) Field of Classification Search .................. 382/103, 382/201, 276, 278, 291
See application file for complete search history.

(56) References Cited

U.S. PATENT DOCUMENTS

| | | | |
|---|---|---|---|
| 5,557,397 A | 9/1996 | Hyde et al. | |
| 6,281,970 B1 | 8/2001 | Williams et al. | |
| 6,307,556 B1 | 10/2001 | Ellanby et al. | |
| 6,522,312 B2 | 2/2003 | Ohshima et al. | |
| 6,879,835 B2 | 4/2005 | Greene et al. | |
| 7,046,214 B2 | 5/2006 | Ebersole, Jr. et al. | |
| 7,127,348 B2 | 10/2006 | Smitherman et al. | |
| 7,136,059 B2 | 11/2006 | Kraus et al. | |
| 7,180,476 B1 | 2/2007 | Guell et al. | |
| 7,363,157 B1 | 4/2008 | Hanna et al. | |
| 2002/0042674 A1* | 4/2002 | Mochizuki et al. | 701/211 |
| 2002/0196202 A1 | 12/2002 | Bastian et al. | |
| 2005/0017721 A1 | 1/2005 | McMracken et al. | |
| 2005/0271301 A1* | 12/2005 | Solomon et al. | 382/294 |

FOREIGN PATENT DOCUMENTS

| | | |
|---|---|---|
| IL | 111069 | 9/1994 |
| WO | WO2005064440 | 7/2005 |

OTHER PUBLICATIONS

Tim Gleue et al "Design and Implementation of a Mobile Device for Outdoor Augmented Reality in the Archeoguide Project", Computer Graphics Center Rundeturmstrasse 64283 Darmstadt, Germany, "Undated downloaded from internet May 5, 2005".

James E. Mower "Implementing an Augmented Scene Delivery System" Department of Geography and Planning UN at Albany, Albany NY12222 USA, "Undated downloaded from internet May 5, 2005".

John Kargiannis et al"Augmented Reality for Visitors of Cultural Heritage Sites Didier Stricker" "Undated downloaded from Internet May 5, 2005".

* cited by examiner

Primary Examiner — Jon Chang
(74) Attorney, Agent, or Firm — Mark M. Friedman

(57) ABSTRACT

A method for displaying point-of-interest coordinate locations in perspective images and for coordinate-based information transfer between perspective images on different platforms includes providing a shared reference image of a region overlapping the field of view of the perspective view. The perspective view is then correlated with the shared reference image so as to generate a mapping between the two views. This mapping is then used to derive a location of a given coordinate from the shared reference image within the perspective view and the location is indicated in the context of the perspective view on a display.

24 Claims, 7 Drawing Sheets

METHODS AND SYSTEM FOR COMMUNICATION AND DISPLAYING POINTS-OF-INTEREST

RELATED APPLICATIONS

This patent application is a Division Application of PCT/IL2007/000608 filed on May 20, 2007, which also claims benefit of IL Patent Application No.175835 filed May 22, 2006, the contents of which are incorporated herein by reference.

FIELD AND BACKROUND OF THE INVENTION

The present invention relates to tracking systems and, in particular, it concerns methods for displaying point-of-interest coordinate locations in perspective images and for coordinate-based information transfer between perspective images on different platforms.

By way of introduction, it is known to employ image processing to identify and/or designate points of interest (or regions) in a wide range of different applications. Examples include, but are not limited to, identification and treatment of diseased areas of crops, early identification and extinguishing of forest fires and image-processing-based navigation aids. In each of these cases, it is common for a point-of-interest ("P.O.I.") to be identified in a first perspective view, for example from an aerial survey of crops or a specialized airborne fire detection system. It is then desirable to identify the same P.O.I. as viewed from another platform, or from the same platform relocated at a new viewpoint, for example, a crop-duster or fire-extinguishing aircraft. The present invention addresses the transfer of the P.O.I. information in a compact but precise format to the second (or displaced) platform.

The present invention relies upon techniques of image registration between images viewed at different viewing angles. These techniques per se are well known in the art and will not be dealt with here in detail.

Israeli Patent No. 111069 to Sroka et al., hereby incorporated by reference for all purposes as if fully set forth herein, describes a method and system for marking objet images acquired at high zooming by an airborne imaging device on a reference image having a wide field of view of the scene. This document does not address the question of information transfer between different platforms.

When image-based tracking systems are used on multiple platforms, information transfer between the platforms is complicated by the different viewing directions of the separate platforms. Even when a point-of-interest, or point-of-interest-related information, is identified in the context of images acquired from a first platform, this information cannot readily be used to identify the point-of-interest or update the point-of-interest-related information in the context of images acquired from another platform.

U.S. Patent Application Publication No. 2002/0196248 to Kraus et al., hereby incorporated by reference for all purposes as if fully set forth herein, partially addresses this problem. Specifically, it describes a method for sharing visual information between a number of command and control ("C&C") units. Although point-of-interest designation is performed in the context of a perspective image, presentation of the information to other users is done in the context of a reference map. This renders it very difficult for the user to integrate the available information with the real-time image interface.

In the context of head-up displays ("HUDs") and helmet-mounted displays ("HMDs"), it is known to present various symbols and other information spatially superimposed over corresponding objects in a scene viewed directly by a pilot. In some cases, position information for the symbols may be derived on the basis of the aircraft position as indicated by an inertial navigation system ("INS") and/or global position system ("GPS"). The resolution of such systems is in the order of degrees, and is hugely interior to the resolution which can be achieved by image correlation in high-resolution optical imaging systems.

There is therefore a need for methods for displaying point-of-interest coordinate locations in perspective images and for coordinate-based information transfer between perspective images on different platforms.

SUMMARY OF THE INVENTION

The present invention is a method for displaying point-of-interest coordinate locations in perspective images and for coordinate-based information transfer between perspective images on different platforms.

According to the teachings of the present invention there is provided, a method for indicating, within a display of an arbitrary perspective view input from an imaging device, a location based upon a coordinate within a shared reference image, the method comprising: (a) providing a shared reference image of a region overlapping at least part of the field of view of the perspective view, the shared reference image having a defined coordinate system; (b) correlating the perspective view with the shared reference image so as to generate a mapping between the perspective view and the shared reference image; (c) employing the mapping to derive a location of a given coordinate of the shared reference image within the perspective view; and (d) indicating the location on the display.

According to a further features of the present invention, in a case where the location of the given coordinate of the shared reference image lies outside the perspective view, there is indicated on the display a direction of angular displacement of the imaging device required to brig the location within the perspective view.

According to a further features of the present invention, there is indicated a magnitude of angular displacement of the imaging device required to bring the location within the perspective view.

According to a further features of the present invention, in a case where the location of the given coordinate of the shared reference image lies outside the perspective view, the imaging sensor is automatically re-aligned to bring the location within the perspective view.

According to a further features of the present invention, the coordinate of the shared reference image is a location of crops requiring treatment.

According to a further features of the present invention the coordinate of the shared reference image is a location of a forest fire.

According to a further features of the present invention, the coordinate of the shared reference image is a location of a landing point for landing an airborne platform carrying the imaging device.

According to a further features of the present invention, the correlating includes: (a) correlating the perspective view with a reference view having a field of view wider the perspective view so as to generate a first mapping transformation; and (b) correlating the reference view with the shared reference image so as to generate a second mapping transformation.

According to a further features of the present invention, the coordinate system is a geographical coordinate system.

There is also provided, according to the teachings of the present invention, a method for transferring information between two users viewing a common region of interest from different viewing directions, each user viewing the region of interest as a perspective view derived from an image sensor and presented on a display, the method comprising: (a) for each user: (i) providing a shared reference image of a region overlapping at least part of the field of view of the perspective view, the shared reference image having a defined coordinate system, and (ii) correlating the perspective view with the shared reference image so as to generate a mapping between the perspective view and the shared reference image; (b) inputting from the first user a location within the first user's perspective view designated as a point-of-interest location; (c) processing the input location, by use of the first user's mapping, to derive a coordinate in the shared reference image corresponding to the point-of-interest location; (d) processing the coordinate, by use of the second user's mapping, to derive a location of the coordinate within the second user's perspective view; and (e) indicating the point-of-interest location on the second user's display.

According to a further features of the present invention, the correlating includes: (a) correlating the perspective view with a reference view having a field of view wider than the perspective view so as to generate a first mapping transformation; and (b) correlating the reference view with the shared reference image so as to generate a second mapping transformation.

According to a further features of the present invention: (a) a second user inputs a location within the second user's perspective view designated as a second point-of-interest location; (b) the input location is processed, by use of the second user's mapping, to derive a coordinate in the shared reference image corresponding to the second point-of-interest location; (c) the coordinate is processed, by use of the first user's mapping, to derive a location of the coordinate within the first user's perspective view; and (d) the point-of-interest location is indicated on the first user's display.

According to a further features of the present invention, the processing the input location is performed using a processing system at a first location, and wherein the processing the coordinate is performed using a processing system at a second location, the method further comprising transmitting the coordinate from the first location to a second location;

According to a further features of the present invention, the transmitting is performed wirelessly.

According to a further features of the present invention the transmitting includes transmitting additional information relating to a point-of-interest at the point-of-interest location.

According to a further features of the present invention, the coordinate system is a geographical coordinate system.

There is also provided, according to the teachings of the present invention, a system for indicating a location based upon a coordinate defined relative to a shared reference image, the system comprising: (a) an imaging sensor; (b) a display; (c) a display driver for receiving images from the image sensor and displaying the images on the display; (d) a data storage device for storing data corresponding to a shared reference image of a region at least partially overlapping a field of view of the image sensor, the shared reference image having a defined coordinate system; and (e) a processing system associated with the imaging sensor, the data storage device and the display driver, the processing system being configured for: (i) correlating a perspective view generated by the imaging sensor with the shared reference image so as to generate a mapping between the perspective view and the shared reference image; (ii) employing the mapping to derive a location of a given coordinate of the shared reference image within the perspective view; and (iii) actuating the display driver to indicate the location in the context of the images on the display.

According to a further features of the present invention, there is also provided a communication interface associated with the processing system and configured for receiving the coordinates from a point-of-interest designating source.

According to a further features of the present invention, the imaging sensor has a given operative field of view, and wherein the processing system is configured for correlating the perspective view with the shared reference image by: (a) correlating the perspective view with a reference view having a field of view wider than the given operative field of view so as to generate a first mapping transformation; and (b) correlating the reference view with the shared reference image so as to generate a second mapping transformation.

According to a further features of the present invention, there is also provided an input device associated with the display driver for user designation of a point-of-interest location with the perspective view.

According to a further features of the present invention, the processing system is further configured for employing the mapping to derive a coordinate in the shared reference image corresponding to a point-of-interest location designated by use of the input device.

According to a further features of the present invention, there is also provided an imaging sensor controller configured for controlling at least a direction of regard of the imaging sensor, wherein the processing system is further configured to activate the imaging sensor controller such that, in a case where the location of the given coordinate lies outside the field of view of the imaging sensor, the imaging sensor controller automatically re-aligns the imaging sensor to bring the location within the field of view.

There is also provided, according to the teachings of the present invention, a method for providing a point-of-interest direction vector to an automated system, the method comprising: (a) providing an imaging sensor mounted in known geometric relation to at least part of the automated system; (b) deriving from the imaging sensor a perspective view; (c) providing a shared reference image of a region at least partially overlapping a field of view of the perspective view, the shared reference image being associated with a defined coordinate system; (d) correlating the perspective view with the shared reference image so as to generate a mapping between the shared reference image and the perspective view; (e) employing the mapping to derive a location of a point-of-interest coordinate from the shared reference image within the perspective view; and (f) providing to the automated system a point-of-interest direction vector indicative of a direction from the at least part of the automated system to the point-of-interest.

According to a further features of the present invention, the automated system includes a helmet worn by a user, wherein the image sensor is provided mounted on the helmet.

According to a further features of the present invention, the automated system further includes a head-up display, the method further comprising displaying a symbol visible to a user aligned with the point-of-interest direction vector.

According to a further features of the present invention, the head-up display is implemented as a helmet-mounted display.

According to a further features of the present invention, in a case where the location of the given coordinate in the shared reference image lies outside the perspective view, there is indicated on the head-up display a direction of angular displacement of the imaging device required to bring the location within the perspective view.

According to a further features of the present invention, there is indicated on the head-up display a magnitude of angular displacement of the imaging device required to brig the location within the perspective view.

According to a further features of the present invention, the automated system includes an optical sight, the method further comprising displaying a symbol visible to a user aligned with the point-of-interest direction vector.

According to a further features of the present invention, the automated system includes a head-up display, the method her comprising displaying a symbol visible to a user aligned with the point-of-interest direction vector.

According to a further features of the present invention, the automated system includes a helmet-mounted display, the method further comprising displaying a symbol visible to a user aligned with the point-of-interest direction vector.

According to a further features of the present invention, the automated system includes an aimable device, the method further comprising automatically aligning the aimable device with the point-of-interest direction vector.

According to a further features of the present invention, the automated system includes a navigatable device, the method other comprising employing the point-of-interest direction vector to navigate the navigatable device to the point-of-interest.

According to a firmer features of the present invention, the automated system includes an inertial navigation system, the method further comprising employing the point-of-interest direction vector to correct errors of the inertial navigation system.

According to a further features of the present invention, the automated system includes an imaging sensor controller configured for controlling a direction of regard of at least the imaging sensor, the method further comprising, in a case where the location of the given coordinate in the shared reference image lies outside the field of view of the imaging sensor, activating the imaging sensor controller to automatically realign the imaging sensor to bring the location within the field of view.

There is also provided, according to the teachings of the present invention, an apparatus for providing a point-of-interest direction vector to an automated system, the point-of-interest being designated by a coordinate in a shared reference image, the apparatus comprising: (a) an imaging sensor mounted in known geometric relation to at least part of the automated system; (b) a data storage device for storing data corresponding to a shared reference image of a region at least partially overlapping a field of view of the image sensor, the shared reference image having a defined coordinate system; (c) an input arrangement for inputting coordinates in the shared reference image of the point-of-interest; and (d) a processing system associated with the imaging sensor, the data storage device, the input arrangement and the automated system, the processing system being configured for: (i) correlating a perspective view generated by the imaging sensor with the shared reference image so as to generate a mapping between the perspective view and the shared reference image; (ii) employing the mapping to derive a location of an input coordinate from the shared reference image within the perspective view, and (iii) providing to the automated system a point-of-interest direction vector indicative of a direction from the at least part of the automated system to the point-of-interest.

According to a further features of the present invention, the automated system includes a helmet worn by a user, wherein the image sensor is mounted on the helmet.

According to a further features of the present invention, the automated system further includes a head-up display, the automated system being configured to provide a symbol visible to a user aligned with the point-of-interest direction vector.

According to a further features of the present invention, the head-up display is implemented as a helmet-mounted display.

According to a further features of the present invention, the automated system includes an optical sight, the automated system being configured to provide a symbol visible to a user aligned with the point-of-interest direction vector.

According to a further features of the present invention, the automated system includes a head-up display, the automated system being configured to provide a symbol visible to a user aligned with the point-of-interest direction vector.

According to a further features of the present invention, the automated system includes a helmet-mounted display, the automated system being configured to provide a symbol visible to a user aligned with the point-of-interest direction vector.

According to a further features of the present invention, the automated system includes an aimable device, the automated system being configured to automatically align the aimable device with the point-of-interest direction vector.

According to a further features of the present invention, the automated system includes a navigatable device, the automated system being configured to employ the point-of-interest direction vector to navigate the navigatable device to the point-of-interest.

According to a further features of the present invention, the automated system includes an inertial navigation system, automated system being configured to employ the point-of-interest direction vector to correct errors of the inertial navigation system.

According to a further features of the present invention, there is also provided an imaging sensor controller configured for controlling a direction of regard of at least the imaging sensor, wherein the processing system is further configured to actuate the imaging sensor controller such that, in a case where the location of the given coordinate in the shared reference image lies outside the field of view of the imaging sensor, the imaging sensor controller automatically re-aligns the imaging sensor to bring the location within the field of view.

BRIEF DESCRIPTION OF THE DRAWINGS

The invention is herein describe by way of example only, with reference to the accompanying drawings, wherein.

DESCRIPTION OF TUE PREFERRED EMBODIMENTS

Figure 1:
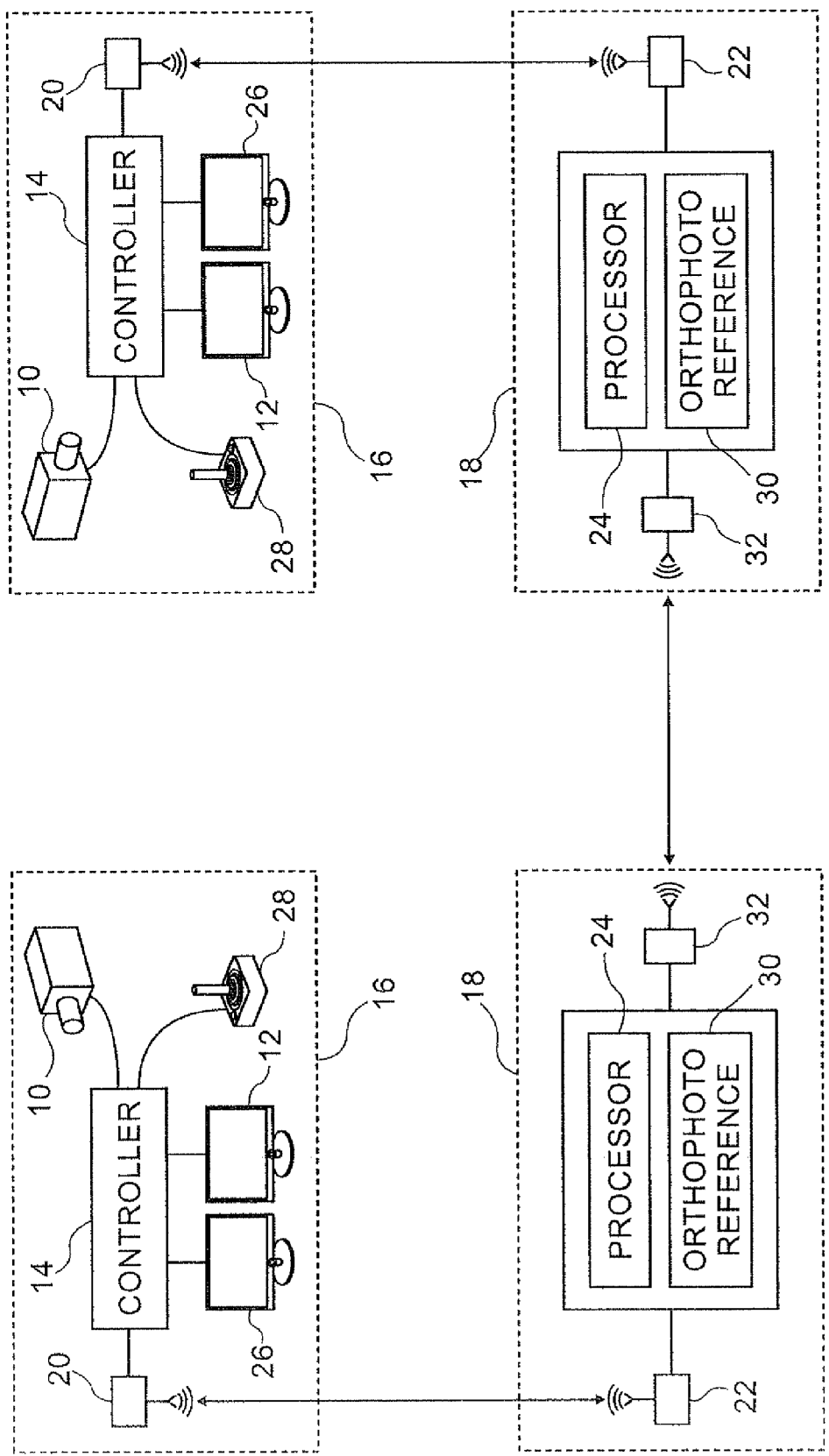
FIG. 1 is a schematic representation of a system, constructed and operative according to the teachings of the present invention, for providing coordinate-based information transfer between platforms viewing objects in different perspective views and displaying the information in the context of the different perspective views.

The present invention is a method for displaying point-of-interest coordinate locations in perspective images and for coordinate-based information transfer between perspective images on different platforms.

The principles and operation of methods according to the present invention may be better understood with reference to the drawings and the accompanying description.

Referring now to the drawings, FIGS. 1-4 illustrate a system and corresponding method according to the teachings of the present invention for transferring information between two users viewing a common region of interest from different viewing directions either simultaneously or sequentially. The system and method of the present invention are applicable to a wide range of civilian and military applications. By way of non-limiting examples, the invention may be used to advantage in applications of screening fields and orchards for disease-affected or infested crops or trees, and for screening large areas of woodlands for forest fires. In either case, special detection equipment may be used initially on an airborne or otherwise elevated platform, and the point-of-interest locations thus identified can then be used for precise visual cuing of crop-dusting or fire-extinguishing aircraft which carry simple imaging systems without sophisticated detection equipment. Details of these and other applications will be better understood by one ordinarily skilled in the art on the basis of the following detailed description.

The typical structural features of the system are shown in FIG. 1. Bach user views an image of the region of interest derived from an image sensor 10 and presented on a display 12 by a controller unit 14. In the case of mobile platforms 16, the images are generally relayed to a corresponding command and control ("C&C") unit 18, for example via wireless transceivers 20 and 22, for processing by a processor system 24. Controller unit 14 typically operates an optical zoom of image sensor 10 for selectively generating views with relatively wide field of view (FOV) and relatively narrow FOV. A "frozen" wide angle view is optionally displayed on a second display 26, preferably with a frame indicating the region of the zoomed view currently being displayed on display 12 to facilitate user orientation. A similar system and various additional preferred features for operation of the system are described in the aforementioned Israeli Patent No. 111069.

Each user is also preferably provided with an input device 28 for designating a point of interest or "target" location in the perspective view shown on display 12. Each C&C unit 18 is also provided with reference data 30 corresponding to a shared reference image of a region overlapping at least part of the field of view of the perspective view of image sensor 10. The shared reference image is "shared" the sense that it is available to each C&C unit and has a defined coordinate system which forms the basis for a concise communication format between the platforms. In certain preferred examples, the coordinate system is a geographical coordinate system, typically corresponding to the standard longitude-latitude or "north-south" coordinate system defined globally across the surface of the Earth. Finally in structural terms, the C&C units 18 are preferably in communication via a wireless data communication system, such as a data-link system, represented by transceivers 32.

Figure 2:
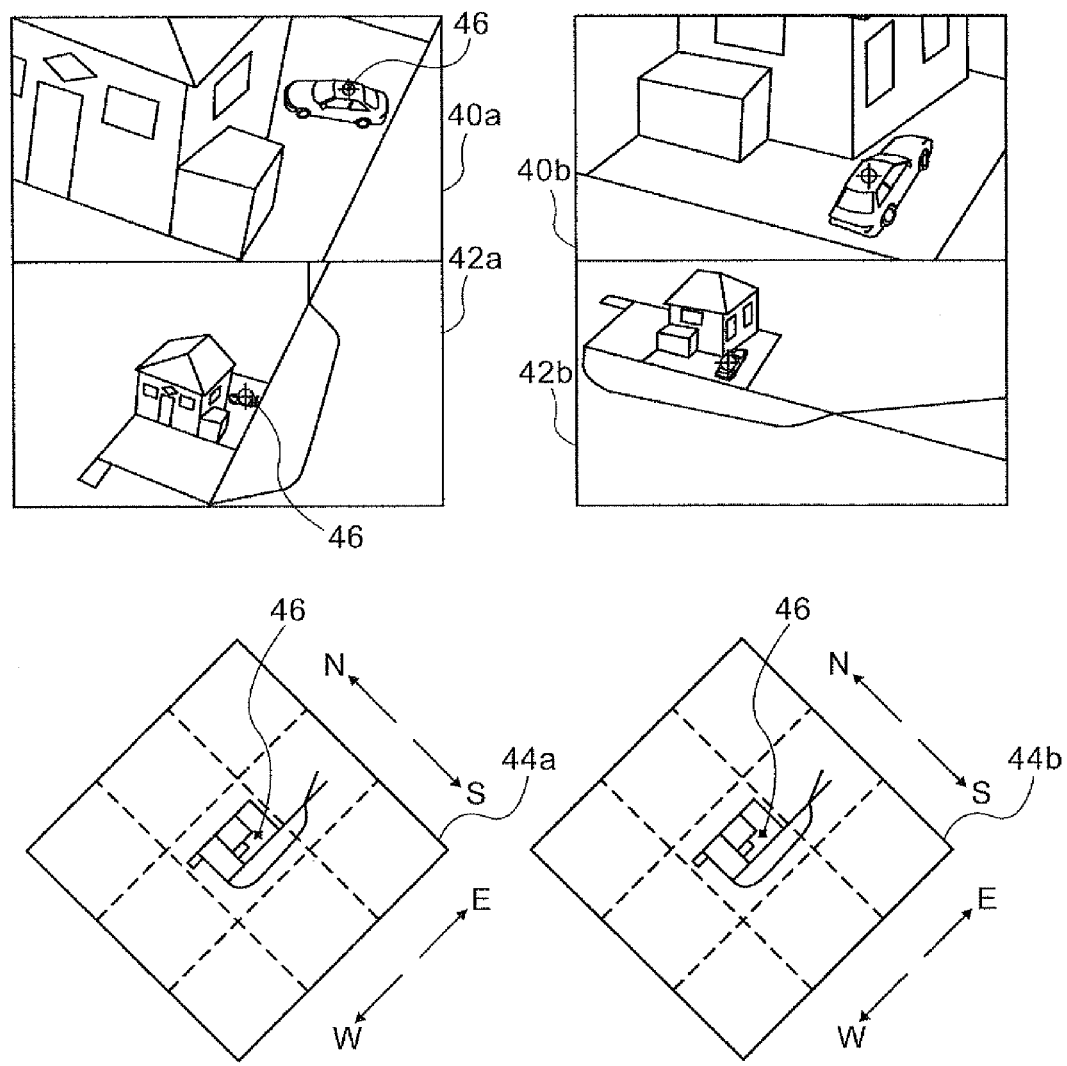
FIG. 2 is a schematic set of perspective and orthogonal views for two users illustrating the principles of the method of information transfer according to the present invention.

FIG. 2 illustrates the relationship between the at least two, and typically three, images/views used by each platform-C&C subsystem. Specifically, there are shown a real-time detailed narrow FOV perspective image 40a, a frozen wide-angle perspective image 42a and a shared reference image 44a. The right side of FIG. 2 shows corresponding views 40b, 42b and 44b for a second platform-C&C subsystem. It will be immediately apparent that, although views 40a and 40b show several common objects, the objects are viewed at different angles and appear in different parts of the view. As a result a user of the first subsystem would not generally be able to convey accurately to the user of the second subsystem the position of any designated point-of-interest.

Figure 3:
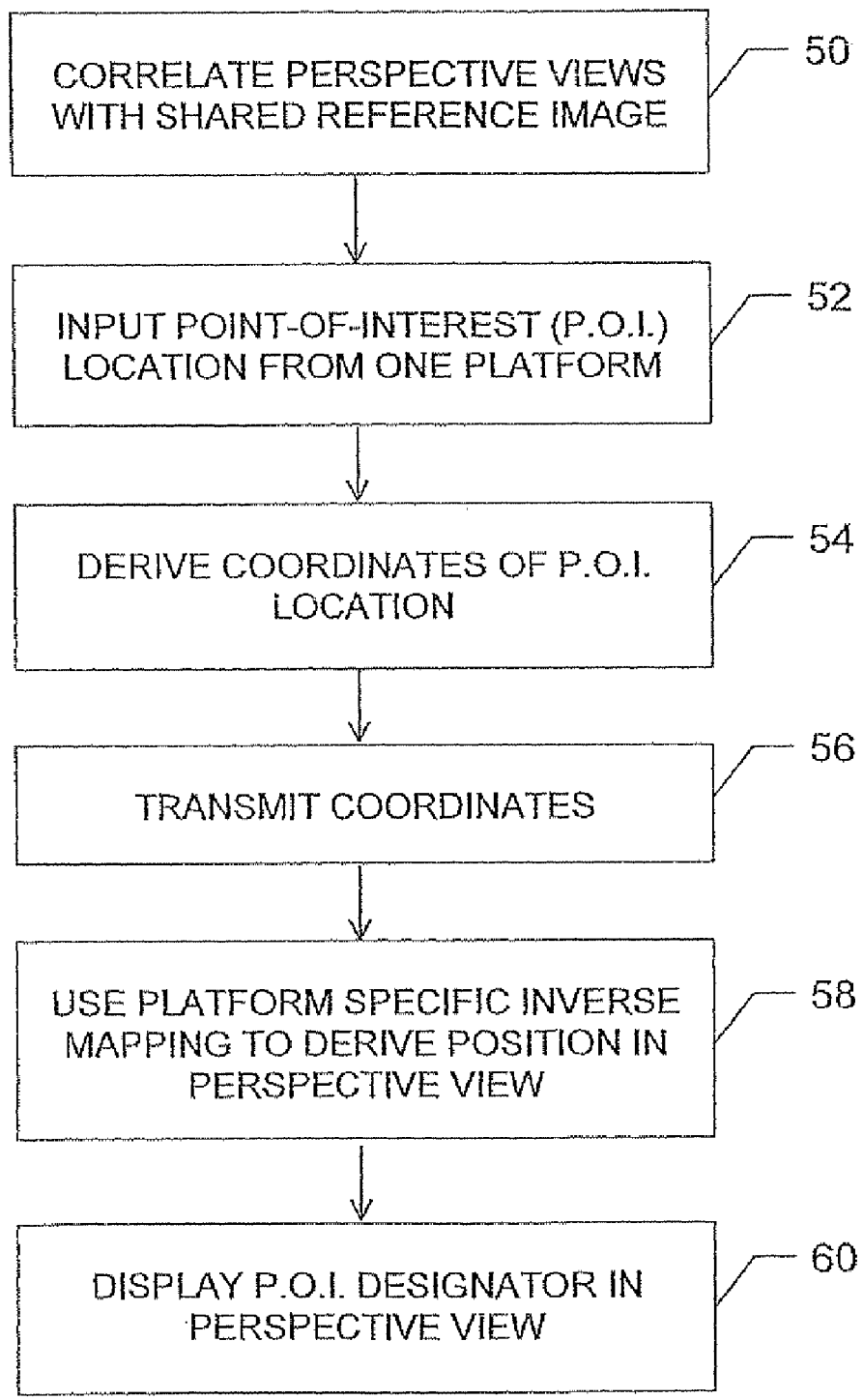
FIG. 3 is a flow diagram illustrating the steps of an implementation of the method of FIG. 2.

The method of the present invention as illustrated in FIG. 3 addresses this problem as follows. Firstly, for each subsystem, the perspective view 40a, 40b is correlated with the corresponding shared reference image 44a, 44b, respectively, so as to generate a mapping between them (step 50). The mapping is an invertible transformation, typically in the form of a matrix of conversion coefficients, which can be used to map any point on the perspective view to a corresponding point on the shared reference image and, in its inverted form, vice versa. The techniques for correlating photographic images with differing viewing directions are known in the art, and are described directly and by reference to other documents in the aforementioned U.S. Patent Application Publication No. 2002/0196248. In the case of a real-time image from an image sensor 10, the mapping is dynamically changing and requires updating or recalculating at intervals depending upon the rate at which the image changes.

The first user then inputs a location within his perspective view 40a designated as a point-of-interest location 46 (step 52). This point-of-interest location 46, defined relative to the view 40a, is transmitted to processing system 24 which derives, by use of the first user's mapping, a coordinate corresponding to the point-of-interest location, marked as 46 in the orthogonal view 44a of FIG. 3 (step 54). Optionally, in the case that the users are associated with separate C&C units, this coordinate is then transmitted, preferably wirelessly, from the first C&C unit to at least a second C&C unit at another location (step 56). Clearly, in the case where both users are associated with the same C&C unit, this transmission is usually unnecessary. The processing system 24 of the second C&C unit then derives, by use of the second user's inverted mapping, a location of the coordinate within the second user's perspective view 406 (step 58) and transmits this position to controller 14 for display as point-of-interest location 46 in the context of the second user's display 40b (step 60). In most preferred implementations, this process is fully bi-directional, allowing each user to both designate point-of-interest locations which are made visually available to other users and to receive visual indications of point-of-interest locations designated by other users.

It will be appreciated that this method offers profound advantages. First and foremost, it allows sharing of information between users viewing objects from different vantage points in an intuitive and precise manner. Furthermore, communication between the C&C units is extremely concise, requiring only a set of coordinates to specify location, optionally accompanied by other textual information to identify the nature of the point-of-interest or specify associated information. The same transmitted information can be used by multiple platforms with different viewing directions, allowing each image display to indicate clearly and precisely the point-of-interest position within the corresponding perspective view. These and other advantages of the present invention will be further understood from the detailed description below.

Before proceeding further, it will be useful to define certain terminology as used herein in the description and claims. Firstly, the word "perspective" is used herein to refer to any non-orthogonal viewing direction. Thus, when two views are described as "different perspective views", it is implied that they have non-coincident viewing directions.

In a further issue of terminology, reference is made herein in the description and claims to an shared reference image which is a photographic representation of the region of interest. The shared reference image is "shared" in the sense that it is available to each C&C unit and has a commonly defined coordinate system which forms the basis for a concise communication format between the platforms. In certain preferred examples, the coordinate system is a geographical coordinate system, typically corresponding to the standard longitude-latitude or "north-south" coordinate system defined globally across the surface of the Earth.

The term "photographic representation" is used herein to refer to a real or simulated image which simulates the properties of an image generated by a corresponding type of image sensor. Thus, the photographic representation typically approximates to an aerial photograph taken at visible wavelength. In certain cases, a shared reference image approximating to a thermal aerial photograph may be used. The different platforms may employ different types of imaging sensors, and the photographic representation need not be of the same image type. Thus, the present invention may be used for designating a point-of-interest position identified in a visible wavelength image and then displaying the point-of-interest position in the context of a thermal image, or the reverse.

The term "platform" is used herein in the description and claims to refer to any platform from which a perspective view of a region of interest can be obtained. It should be noted that the present invention is not limited to airborne platforms, and can equally be used where some or all of the image sensors are located on other platforms such as observation towers or look-out points. It should also be noted that the platform need not be a manned platform. In the case of an unmanned platform, such as an unmanned aerial vehicle ("UAV"), the user displays and input device are typically located at the corresponding C&C unit.

According to a further optional feature, if the current field of view of the zoomed-in image sensor image does not include the point-of-interest location, the system provides cues to the user or otherwise assists in identifying the required point-of-interest. In a simple implementation, the controller 14 may be configured to generate an arrow indicative of a direction, and optionally angular displacement, in which the camera must be deflected in order to bring the point-of-interest location into view. Additionally, or alternatively, controller 14 may be automatically, or manually, actuated to redirect and/or zoom-out the image sensor so as to brig the point-of-interest location into the field of view.

Figure 4:
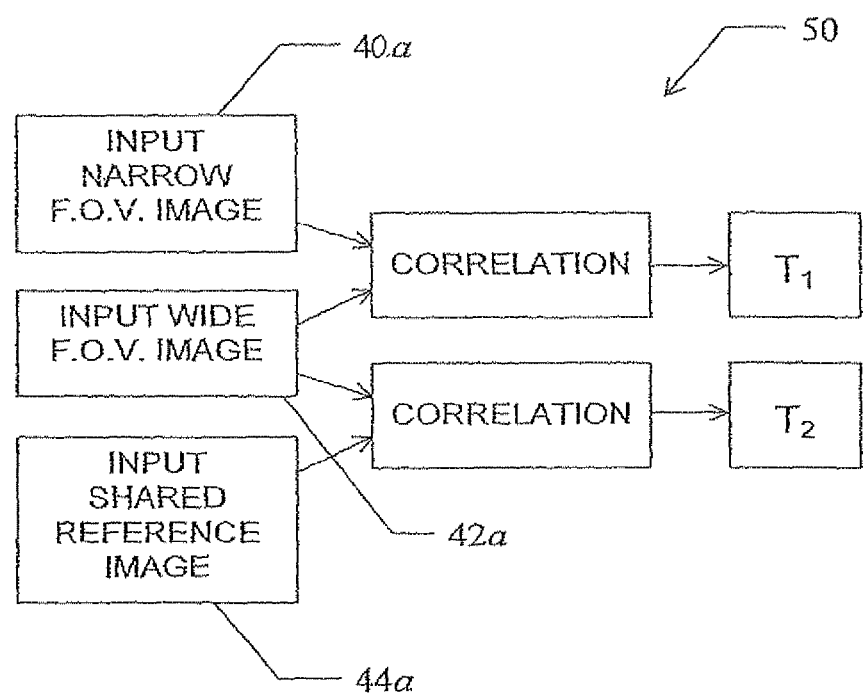
FIG. 4 is a schematic representation of a two-step implementation of a correlation calculation from the method of FIG. 3.

As mentioned earlier, preferred configurations of a system for implementing the present invention typically employ a frozen wide-angle image in addition to the zoomed-in current image. This wide-angle image is often necessary to provide sufficient data for reliable correlation with the shared reference image. As a result certain preferred implementations of the present invention perform the correlation step 50 as a two-step correlation as illustrated in FIG. 4. Specifically, the narrow FOV image 40a is correlated with the wide FOV image 42a to generate a first mapping transformation $T_1$, and the wide FOV image 42a is correlated with the shared reference image 44a to generate a second mapping transformation $T_2$. In this case, the reverse transformation to generate a location within the image from an input coordinate will also be a two-step transformation.

While this two-step correlation is believed to be the preferred implementation for high resolution applications, it should be noted that a single-step correlation is also with the scope of the invention. Specifically, for many applications, the resolution of the wide FOV image, optionally magnified for display to the user by digital zoom techniques, may provide sufficient resolution for point-of-interest designation while simultaneously containing sufficient features for direct correlation with the orthogonal reference.

Parenthetically, it should be noted that the point-of-interest location may designate an object which is either indiscernible or does not appear at all in one or both of the frozen wide FOV image and the shared reference image. For example, in the images shown in FIG. 2, the point-of-interest location 46 designates the current position of a vehicle on fire which was not present in the frozen view 42a or in the orthogonal reference 44a. So long as sufficient content remains similar between the images to allow effective correlation of the images, this does not interfere with implementation of the method of the present invention.

It should be noted that correlation step 50 does not have to be done for all users prior to designation. In fact, as mentioned earlier, the correlation "step" is typically a continuously performed process which maintains correlation between a real-time image and the reference shared reference image. If the correlation is kept updated at all times, only the transformation calculations need be performed during conversion between perspective and coordinate frames of reference. As a result the transfer of information between platforms can be achieved almost instantly in real-time.

In some cases, the point-of-interest location data may be used by a system which was not in visual contact with the point-of-interest at the time the point-of-interest was designated. One example of such an application would be in aerial firefighting where advanced airborne thermal detection equipment may be used for early identification of a center of a forest fire before it could be identified by video imaging and/or for planning of a strategy to prevent spread of the fire. Other firefighting aircraft carrying relatively simple imaging systems may then be dispatched to try to implement the strategy and control the fire. In this context an exact coordinate location established by the detection equipment can be designated on the video display of the firefighting aircraft by the method of the present invention to facilitate rapid and precise identification of the point-of-interest location.

Figure 5:
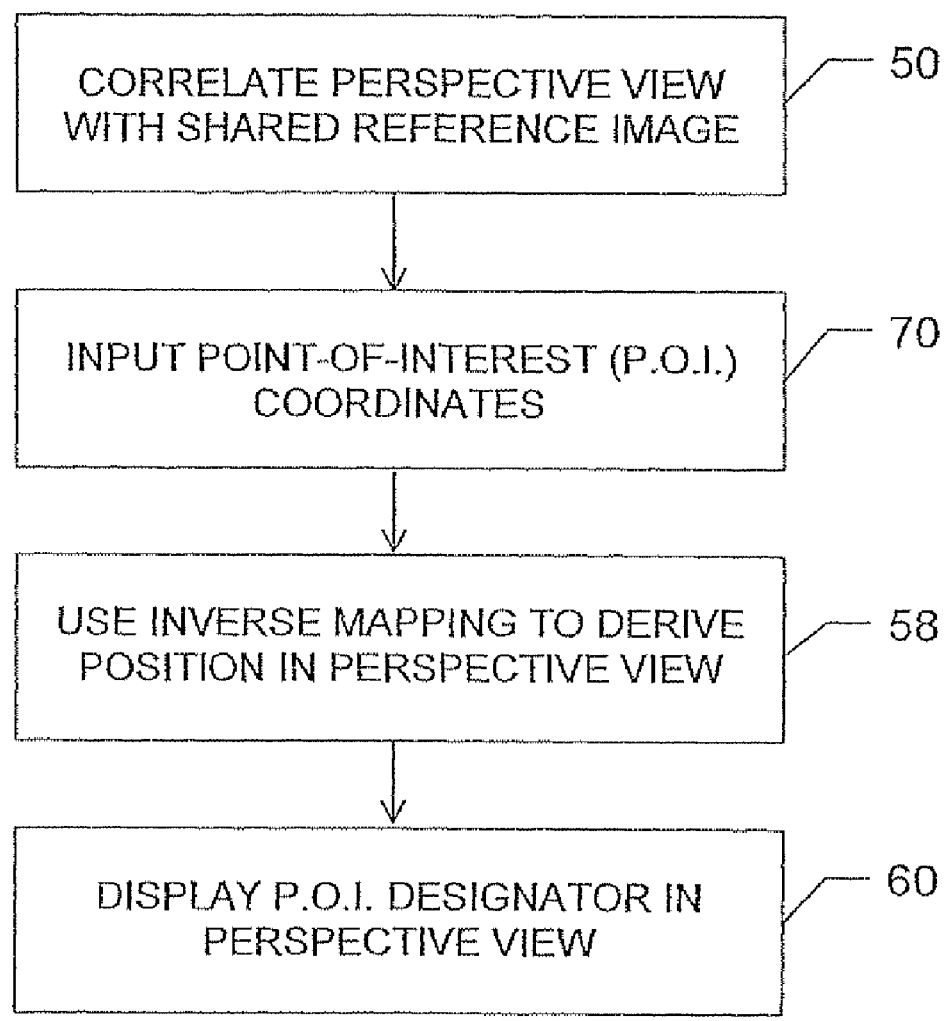
FIG. 5 is a simplified unidirectional implementation of the method of FIG. 3.

Referring now to FIG. 5, it should be noted that a simplified unidirectional implementation of the method of the present invention may be used in any circumstances where a point-of-interest location is known in coordinate form from any source. The simplified implementation requires the same correlation 50 of the perspective image from each platform to the shared reference image as discussed above. Then, after input of the point-of-interest coordinates (step 70), the inverse mapping and display steps 58 and 60 are performed as above.

Figure 6A:
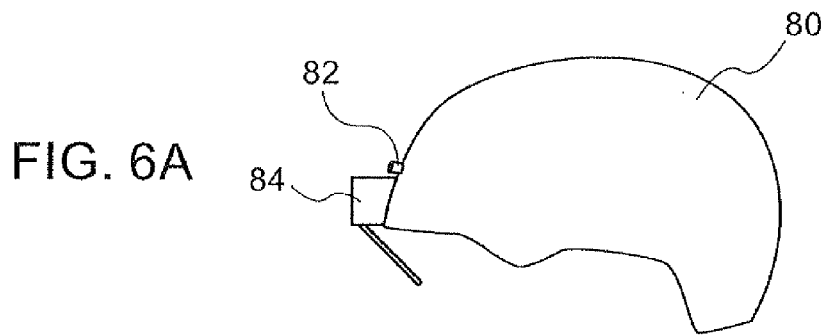
FIG. 6A is a schematic representation of a first application of the present invention for providing image-derived point-of-interest direction vectors to an automated system based on point-of-interest coordinate information, wherein the point-of-interest direction is indicated to a user on a head-up display.
Figure 6B:
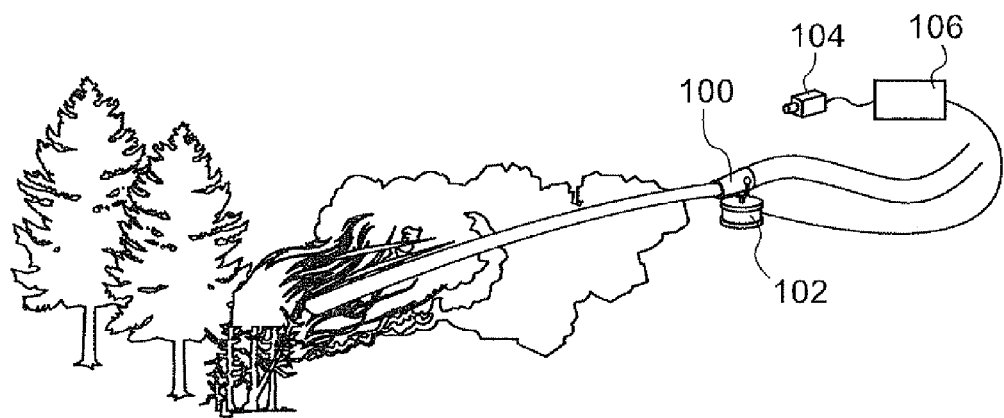
FIG. 6B is a schematic representation of a second application of the present invention for providing image-derived point-of-interest direction vectors to an automated system based on point-of-interest coordinate information, wherein the point-of-interest direction is used for automatically aiming an aimable device at the point-of-interest.
Figure 6C:
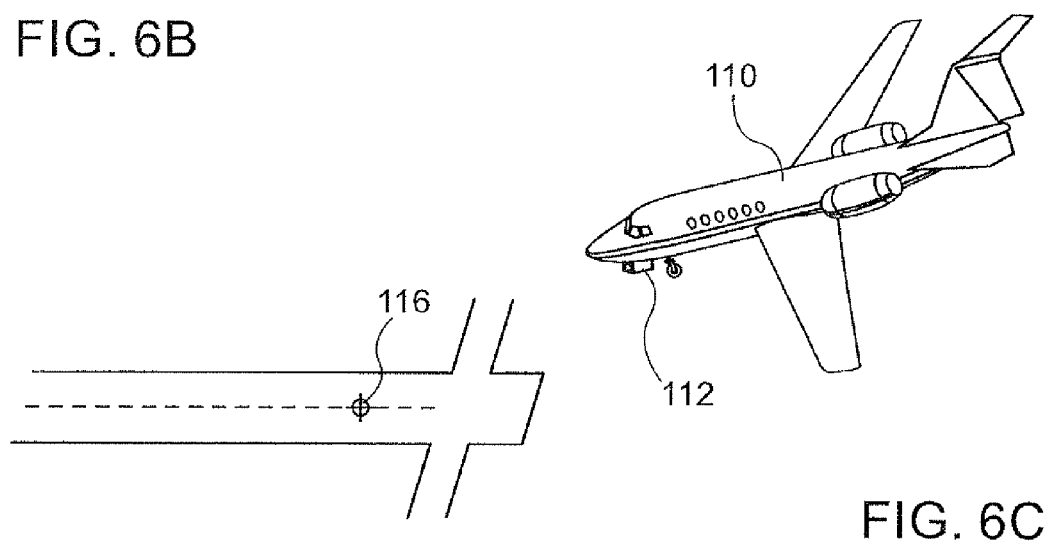
FIG. 6C is a schematic representation of a third application of the present invention for providing image-derived point-of-interest direction vectors to an automated system based on point-of-interest coordinate information, wherein the point-of-interest direction is used for navigating a navigatable device to the point-of-interest.
Figure 7:
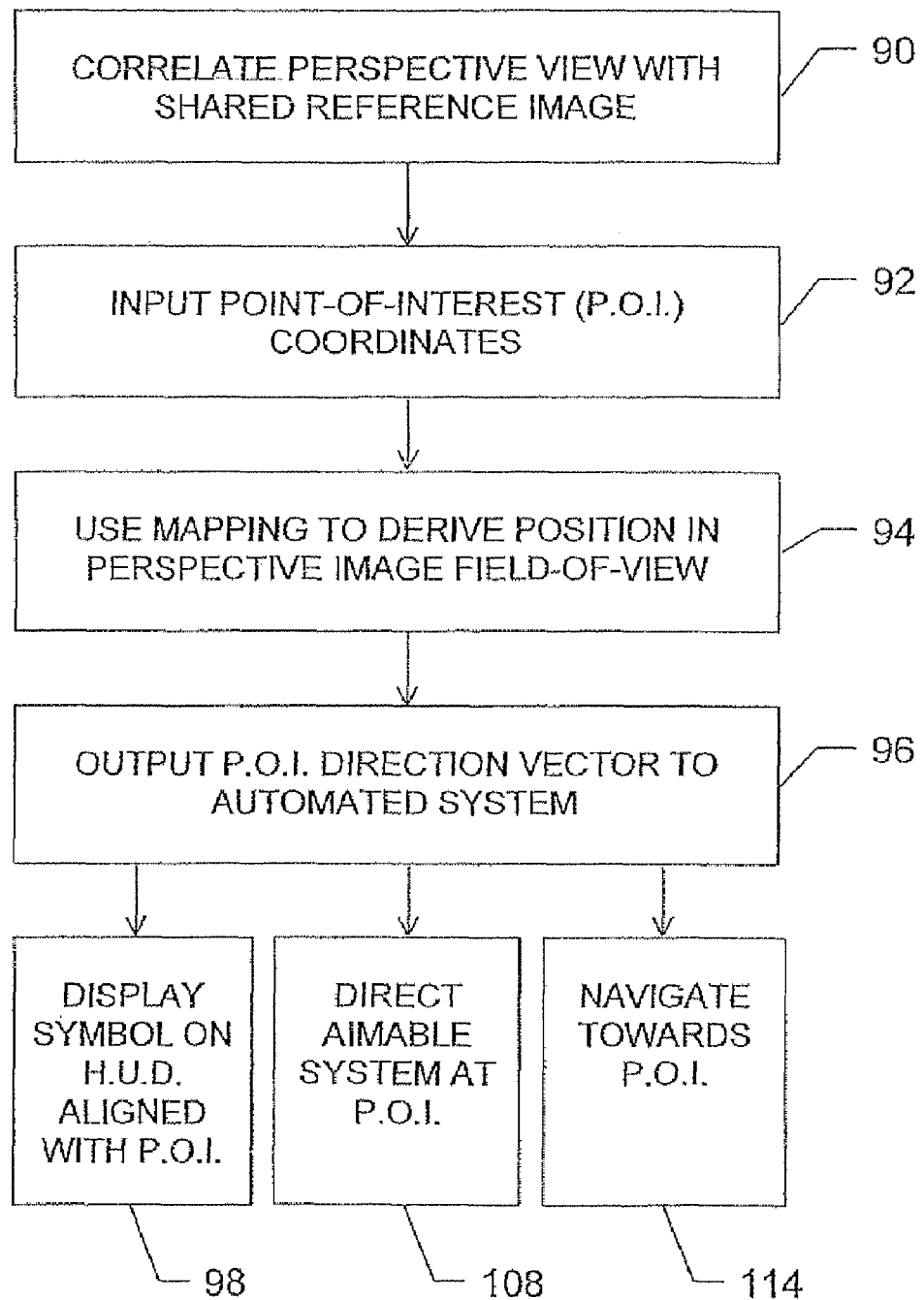
FIG. 7 is a flow diagram illustrating the operation and corresponding methods of the applications of FIGS. 6A-6C.

Referring now additionally to FIGS. 6 and 7, it should be noted that the present invention is not limited to displaying points-of-interest in the context of an image. The ability to process point-of-interest coordinates using image correlation to accurately locate a point-of-interest in an arbitrary perspective image may be used to advantage to provide a point-of-interest direction vector in various automated applications even where no image is displayed to a user. A number of non-limiting examples will now be discussed with reference to FIGS. 6A-6C and 7.

Referring first to FIG. 6A, this shows a case of a helmet system enhanced according to the teachings of the present invention. Specifically, there is shown a helmet 80 which supports a small forward-looking camera 82 for visible or IR wavelengths. According to the teachings of the present invention, the images from camera 82 are downloaded to a suitable processing system (such as the C&C unit 18 of FIG. 1) and are processed to derive the correlation mapping for the current perspective view (step 90 in FIG. 7). Using this mapping, a point-of-interest coordinate (input at step 92) is converted to a position within the field of view of camera 82 (step 94) and hence, according to the predefined camera geometry, to a point-of-interest direction vector indicative of the viewing direction of the point-of-interest relative to the helmet (step 96). The point-of-interest is then preferably indicated to the user as a symbol displayed by a head-up display (HUD) superimposed upon the user's direct view of the real scene (step 98). Most preferably, the HUD is a helmet-mounted display (HMD) 84 (FIG. 6A).

Parenthetically, it should be noted that the camera 82 of these automated system examples may either be in fixed geometrical relation to at least part of the automated system, or may be gimbaled or otherwise mobile so long as there is a suitable measurement system for determining the geometrical relationship between the current camera FOV parameters and the relevant part of the automated system. By way of example, if a helmet position tracking system is use the point-of-interest direction relative to a moving platform on which the helmet user is traveling can also be deduced. This allows display of the point-of-interest on a cockpit-mounted HUD.

Turning now to FIG. 6B, this illustrates a further group of applications in which the automated system includes an aimable device, in is case, a fire extinguishing hose 100 directed by an actuation system 102. The system is enhanced by a video camera 104 and an associated electronic controller 106 which handles the downlink/uplink communication and controls actuation system 102. Here too, the operation proceeds according to steps 90-96 of FIG. 7 and, at step 108, the system aims the aimable system, e.g., the fire hose, at the point-of-interest.

Turning finally to FIG. 6C, this illustrates a still further group of applications in which the automated system includes a navigatable device, in this case, a passenger aircraft 110. The device has a video or thermal camera 112 and the other necessary components of the system of the present invention as described above (not shown), as well as a navigation system (not shown). In this case, the operation proceeds according to steps 90-96 of FIG. 7 and, at step 114, the navigatable device employs the point-of-interest direction vector, in this case designating a desired touch-down point 116 (FIG. 6C) for landing, for navigating the navigatable device to the point-of-interest. Ea this example, the system may optionally function as a high-resolution short-range supplement to a GPS-based or inertial navigation system (INS), providing high-precision autopilot functionality capable of a fully automated landing with sub-meter precision. Clearly, this application is not limited to passenger aircraft, and is equally applicable to unmanned air vehicles (UAV's), and unpowered airborne devices such as gliders.

According to a further supplementary, or alternative, feature, the system and method of the present invention may be used to provide reference data for correcting errors of an INS. Specifically, a precise point-of-interest direction vector towards a point of known coordinates can be compared with the corresponding vector as would be predicted by the INS motion data and a correction calculated. In practice, this is best implemented using a Kalman filter arrangement as is known to those skilled in the art of transfer alignment of inertial systems.

It will be appreciated that the above descriptions are intended only to serve as examples, and that many other embodiments are possible within the scope of the present invention as defined in the appended claims.

What is claimed is:

1. A method for providing a point-of-interest direction vector to an automated system, the method comprising:
    (a) providing an imaging sensor mounted in known geometric relation to at least part of the automated system;
    (b) deriving from said imaging sensor a perspective view;
    (c) providing a shared reference image of a region at least partially overlapping a field of view of the perspective view, said shared reference image being associated with a defined coordinate system;
    (d) correlating the perspective view with said shared reference image so as to generate a mapping between said shared reference image and said perspective view;
    (e) employing said mapping to derive a location of a point-of-interest coordinate from said shared reference image within the perspective view; and
    (f) providing to the automated system a point-of-interest direction vector indicative of a direction from the at least part of the automated system to the point-of-interest.

2. The method of claim 1, wherein the automated system includes a helmet worn by a user, wherein the image sensor is provided mounted on said helmet.

3. The method of claim 2, wherein the automated system further includes a head-up display, the method further comprising displaying a symbol visible to a user aligned with the point-of-interest direction vector.

4. The method of claim 3, wherein said head-up display is implemented as a helmet-mounted display.

5. The method of claim 3, further comprising, in a case where said location of the given coordinate in said shared reference image lies outside the perspective view, indicating on said head-up display a direction of angular displacement of the imaging device required to bring said location within the perspective view.

6. The method of claim 5, further comprising indicating on said head-up display a magnitude of angular displacement of the imaging device required to bring said location within the perspective view.

7. The method of claim 1, wherein the automated system includes an optical sight, the method further comprising displaying a symbol visible to a user aligned with the point-of-interest direction vector.

8. The method of claim 1, wherein the automated system includes a head-up display, the method further comprising displaying a symbol visible to a user aligned with the point-of-interest direction vector.

9. The method of claim 1, wherein the automated system includes a helmet-mounted display, the method further comprising displaying a symbol visible to a user aligned with the point-of-interest direction vector.

10. The method of claim 1, wherein the automated system includes an aimable device, the method further comprising automatically aligning said aimable device with the point-of-interest direction vector.

11. The method of claim 1, wherein the automated system includes a navigatable device, the method further comprising employing the point-of-interest direction vector to navigate said navigatable device to the point-of-interest.

12. The method of claim 1, wherein the automated system includes an inertial navigation system, the method further comprising employing the point-of-interest direction vector to correct errors of the inertial navigation system.

13. The method of claim 1, wherein the automated system includes an imaging sensor controller configured for controlling a direction of regard of at least said imaging sensor, the method further comprising, in a case where said location of the given coordinate in said shared reference image lies outside the field of view of the imaging sensor, activating said imaging sensor controller to automatically re-align said imaging sensor to bring said location within the field of view.

14. An apparatus for providing a point-of-interest direction vector to an automated system, the point-of-interest being designated by a coordinate in a shared reference image, the apparatus comprising:
(a) an imaging sensor mounted in known geometric relation to at least part of the automated system;
(b) a data storage device for storing data corresponding to a shared reference image of a region at least partially overlapping a field of view of said image sensor, said shared reference image having a defined coordinate system;
(c) an input arrangement for inputting coordinates in said shared reference image of the point-of-interest; and
(d) a processing system associated with said imaging sensor, said data storage device, said input arrangement and the automated system, said processing system being configured for:
(i) correlating a perspective view generated by said imaging sensor with said shared reference image so as to generate a
mapping between said perspective view and said shared reference image; (ii) employing said mapping to derive a location of an input coordinate from said shared reference image within the perspective view; and (iii) providing to the automated system a point-of-interest direction vector indicative of a direction from the at least part of the automated system to the point-of-interest.

15. The apparatus of claim 14, wherein the automated system includes a helmet worn by a user, wherein said image sensor is mounted on said helmet.

16. The apparatus of claim 15, wherein the automated system further includes a head-up display, the automated system being configured to provide a symbol visible to a user aligned with the point-of-interest direction vector.

17. The apparatus of claim 16, wherein said head-up display is implemented as a helmet-mounted display.

18. The apparatus of claim 14, wherein the automated system includes an optical sight, the automated system being configured to provide a symbol visible to a user aligned with the point-of-interest direction vector.

19. The apparatus of claim 14, wherein the automated system includes a head-up display, the automated system being configured to provide a symbol visible to a user aligned with the point-of-interest direction vector.

20. The apparatus of claim 14, wherein the automated system includes a helmet-mounted display, the automated system being configured to provide a symbol visible to a user aligned with the point-of-interest direction vector.

21. The apparatus of claim 14, wherein the automated system includes an aimable device, the automated system being configured to automatically align said aimable device with the point-of-interest direction vector.

22. The apparatus of claim 14, wherein the automated system includes a navigatable device, the automated system being configured to employ the point-of-interest direction vector to navigate said navigatable device to the point-of-interest.

23. The apparatus of claim 14, wherein the automated system includes an inertial navigation system, automated system being configured to employ the point-of-interest direction vector to correct errors of the inertial navigation system.

24. The apparatus of claim 14, further comprising an imaging sensor controller configured for controlling a direction of regard of at least said imaging sensor, wherein said processing system is further configured to actuate said imaging sensor controller such that, in a case where said location of the given coordinate in said shared reference image lies outside the field of view of the imaging sensor, said imaging sensor controller automatically re-aligns said imaging sensor to bring said location within the field of view.

* * * * *